F. A. BRADLEY.
Improvement in Top Prop for Carriages.
No. 4,869. Reissued April 16, 1872.
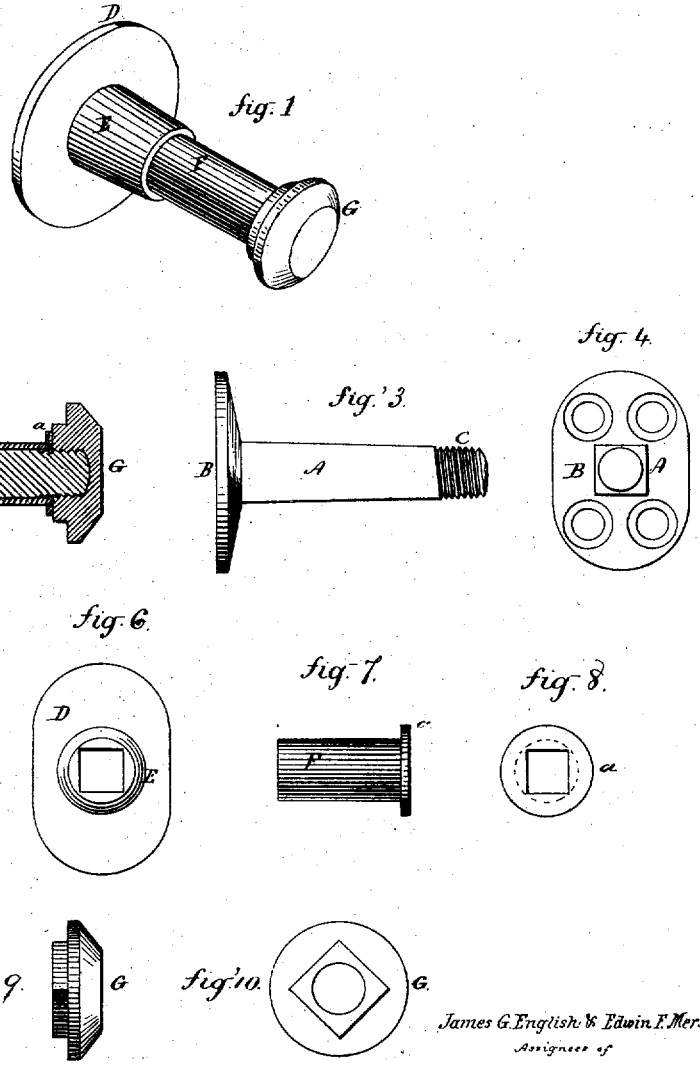
James G. English & Edwin F. Mersick
Assignees of
Frederick A. Bradley.
Inventor
By his Atty.
John E. Earle
Witnesses
J. B. Shumway
A. J. Tibbitts
AM. PHOTO-LITHOGRAPHIC CO. N.Y. (OSBORNE'S PROCESS.)

UNITED STATES PATENT OFFICE.

FREDERICK A. BRADLEY, OF NEW HAVEN, CONNECTICUT, ASSIGNOR, BY MESNE ASSIGNMENTS, TO JAMES G. ENGLISH AND EDWIN F. MERSICK.

IMPROVEMENT IN TOP-PROPS FOR CARRIAGES.

Specification forming part of Letters Patent No. 82,203, dated September 15, 1868; reissue No. 4,869, dated April 16, 1872.

*To all whom it may concern:*

Be it known that FREDERICK A. BRADLEY, of New Haven, in the county of New Haven and State of Connecticut, invented a new Improvement in Top-Props for Carriages; and we do hereby declare the following, when taken in connection with the accompanying drawing and the letters of reference marked thereon, to be a full, clear, and exact description of the same, and which said drawing constitutes part of this specification, and represents, in—

Figure 1, a perspective view of the prop complete; Fig. 2, a longitudinal central section of the same; Fig. 3, a side view of the stud; Fig. 4, an end view of the same; Fig. 5, a side view of the covering-plate; Fig. 6, an end view of the same; Fig. 7, a side view of the sleeve; Fig. 8, an end view of the same; Fig. 9, a side view of the nut; Fig. 10, an end view of the same.

This invention relates to an improvement in the article known to the trade as "top-props for carriages"—that is, the stud which is secured to the bows of the carriage-top, and to the seat or body of the carriage, and upon which are placed the braces, the said stud forming a joint upon which the braces turn as the top is opened or closed. Heretofore props have been constructed so that the bearing came directly on the stud, and the nut screwed to a shoulder on the stud next to the brace, whereby the turning of the braces was liable to loosen and displace the nut. The object of this invention is to overcome this difficulty, as also to construct a prop which may be attached to the bow outside the leather, and, at the same time, provide a covering over the attachment to the bow, in order to give the prop a neat and finished appearance.

A is a square stud, or of other than cylindrical form, extending from its base or plate B, as seen in Fig. 3, its end provided with a thread, C, and the base perforated for the insertion of screws to secure the stud to the bow. The stud is placed on the outside of the bow after the bow has been covered; therefore, to cover the screws and the plate B in order to present a neater and more finished appearance, I form a plate, D, having a sleeve, E, extending therefrom, together forming the base of the prop, the exterior of this base, as to its form, being immaterial, so that the sleeve be extended at its inner end to produce the desired finished effect. Said sleeve fits over the stud A, and is constructed as seen in Figs. 4 and 5, and placed over the stud, as seen in Fig. 2, so as to completely cover the base B of the stud, and forms the inside shoulder of the brace-end, and also gives to the base of the prop a neat and finished appearance. To form a bearing for the ends of the braces I construct a sleeve, F, seen in Figs. 7 and 8, so as to fit over the stud, and provided upon its outer end with a flange, *a*. The diameter of the sleeve F is less than that of the sleeve E of the covering-plate D, so that when the sleeve F is set onto the stud, as seen in Fig. 2, the end of the sleeve E forms a shoulder, against which the braces bear. The end of the brace is bored out to correspond to the diameter of the sleeve F, and the sleeve F is set into the hole in the end of the brace, and then set onto the stud, as seen in Fig. 2. Outside the hole a nut, G, is fixed, as seen in Fig. 2, to bear upon the flange or collar *a*, and, as the collar *a* cannot revolve, the nut cannot be turned from its place by the operation or action of the braces. The nut, turned hard upon the flange or end of the sleeve F, forces that to bear against the end of the sleeve E, thus forcing and holding the sleeve E and its plate D in place by means of the nut on the outer end of the stud. The flanged sleeve F and nut G upon a stud may be applicable to other uses where there is liability of the accidental removal of the nut by turning on the bearing, it only being essential that in some manner the flanged sleeve be prevented from turning.

It will be evident to those familiar with the construction or use of carriage-props that the first object of this invention—that is, to prevent the displacement of the nut by the turning of the brace—is accomplished by the flange or collar *a*, it being only required that it be fitted to the stud so as not to turn thereon, and therefore does not require the presence of the sleeve F as an essential part of the said collar.

We claim as the invention of the said FREDERICK A. BRADLEY—

1. In combination with the stud of a carriage-prop and the nut thereon, we claim a flange or collar, *a*, arranged between said nut and the brace-end to avoid the contact of the two, when the said collar is prevented from turning by the other than perfect cylindrical form of the said stud.

2. In combination with a stud, A, we claim the sleeve F, formed with the flange *a* and the nut G, arranged so as to bear against the said flange, substantially as herein set forth.

3. In combination with the stud A formed upon the plate B, we claim the covering-plate D, with its neck or sleeve E, when constructed and arranged so as to cover the plate B, substantially in the manner herein set forth.

4. In combination with the stud of a car riage-prop and the sleeve E forming its base, we claim the sleeve F, with its flange *a*, and the nut upon the end of the stud, whereby the said sleeve E is held in position, substantially as described.

JAMES G. ENGLISH,
EDWIN F. MERSICK,
*Assignees of* FREDERICK A. BRADLEY.

Witnesses:

CLINTON CHAMBERLAIN,
JOHN H. SHUMWAY.